2,951,054

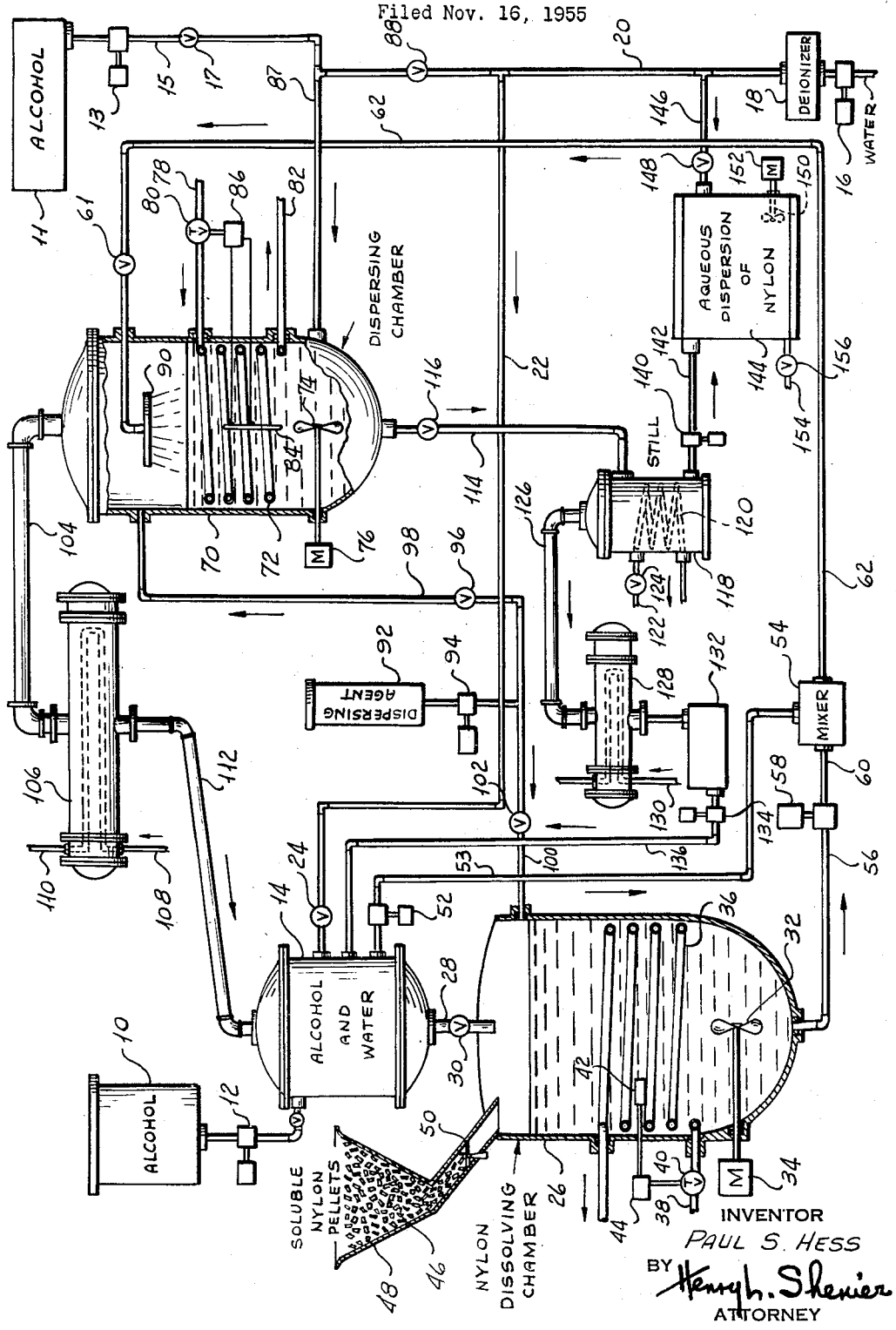

METHOD OF MAKING AQUEOUS DISPERSIONS OF NYLON

Paul S. Hess, West Orange, N.J., assignor to General Dispersions, Inc., Paterson, N.J., a corporation of New Jersey Filed Nov. 16, 1955, Ser. No. 547,095

4 Claims. (Cl. 260—29.2)

My invention relates to aqueous dispersions of polyamide resins, such as nylon, and more particularly to aqueous dispersons of nylon having concentrations of resin as high as 25% by weight.

It is known that nylon resins may be dispersed in water. The methods known to the prior art of forming such dispersions are batch methods in which nylon is dissolved in an alcohol-water solution which is then added to distilled or deionized water containing a dispersing agent. Following this, excess alcohol and water are removed with heat under a reduced pressure. The methods of the prior art are such that from 40% to 50% of the nylon coagulates or flocculates during the dispersion forming step. The coagulated nylon particles represent a distinct loss in that the yields of final dispersion obtained by methods of the prior art have been so low as to make these dispersions economically unavailable for general use. Besides this, owing to the loss of nylon in forming the aqueous dispersions, initial concentrations of nylon greater than 5% have been substantially impossible of attainment. The batch methods of the prior art require large and expensive pieces of equipment, including vacuum apparatus.

Aqueous solutions of nylon have many fields of usefulness. A clear continuous film can be formed from the dispersion by heating a wet film for about one to thirty minutes at temperatures in the vicinity of 150° F. to 180° F., or higher. If the wet film is permitted to dry at room temperatures, a tough continuous film which is cloudy is formed. The finished films are flexible and not tacky. All of the advantages of a nylon coating are obtained. Nylon, of course, is nonsoluble in most solvents, including aliphatic and aromatic halogenated and nonhalogenated hydrocarbons, as well as in ketones, esters and carbon disulfide. The nylon film has excellent resistance to both hot and cold aqueous alkali solutions. These properties give the aqueous dispersions of nylon areas of usefulness in the textile, paper, leather, glass, electrical insulation and other fields. Nylon coatings formed from aqueous dispersions of nylon may readily be applied to wood, metal, glass, paper, leather, linoleum, and the like.

One object of my invention is to provide an improved method of making aqueous dispersions of nylon which reduce the fire hazard and require a minimum size of equipment.

Another object of my invention is to provide a continuous method of making aqueous dispersions of nylon.

Another object of my invention is to provide a method of making aqueous dispersions of nylon in which there is 100% utilization of nylon in the process.

Other and further objects of my invention will appear from the following description.

In general, my invention contemplates forming a mixture of alcohol and water and dissolving alcohol-soluble nylon in the alcohol-water mixture at an elevated temperature. Whenever the word "nylon" is used in the instant specification, it shall mean an alcohol-soluble, orientable, fiber-forming, long-chain, synthetic polymeric carbonamide which has recurring amide groups as an integral part of the main polymer chain. This temperature is so controlled that it is always below a temperature at which either the alcohol or the water will be distilled from the mixture. Stated otherwise, the temperature at which the initial solution is formed is such that the vapor pressure will be low or substantially zero. The concentration of nylon in the initial solution may be higher than that required in the dispersing step. After the initial solution is formed, it may be diluted so that it contains between 3% and 6% of nylon by weight and is then introduced slowly to a dispersing zone. The dispersing zone contains a mixture of water and alcohol. For example, the mixture may comprise 83% water and 17% ethyl alcohol, which mixture has a boiling point of 87° C. The distillate at this boiling point will have 70% alcohol by weight and 30% water by weight. This alcohol-water mixture may be recycled to make up the original nylon solution. Introduction of the initial solution into the dispersing zone begins after the boiling temperature is reached. The process is such that this boiling point is maintained by adding nylon solution at a rate which, when compared with the rate of heat exchange and the temperature of the heating medium, is such as continuously to maintain the desired temperature. It is to be understood, of course, that the process is preferably carried out at atmospheric pressure. If it is desired to carry out the process at other pressures, adjustments in temperature must be made. Similarly, it is to be understood, of course, that the boiling point may be reduced to as low as 78.2° C., in which case the vapors will have a content of alcohol by weight of 92% and water by weight of 8%. I can use a temperature as high as 91.5° C., in which case the vapors will contain 55% of alcohol by weight and 45% of water by weight. I cannot use a higher temperature than this without affecting deleteriously the solubility of the nylon. When the temperature is maintained, that is, when the rate of introduction of the initial nylon solution with respect to the heat transfer rate is proper, a constant temperature and a constant liquid level will be maintained in the vessel at all times. A dispersing agent may be added in the dispersing zone. If desired, it may be added at the time the initial solution is made. After the nylon has been dispersed, the dispersion is withdrawn from the dispersing zone and passed to a still in which the alcohol is evaporated from the solution to form an aqueous dispersion of nylon. The concentration of nylon in this dispersion may be as high as 25%. The nylon dispersion is pumped to a storage tank to which distilled or deionized water may be passed and admixed with the concentrated dispersion to form any desired concentration of nylon in the dispersion. For most uses the concentration of nylon in the aqueous dispersion will vary between 5% and 10% by weight. It is understood, of course, that a dispersion may be formed with as little as 0.1% nylon present, or that, if desired, concentrations of nylon up to 25% by weight may be employed.

The accompanying figure is a diagrammatic view of one form of apparatus capable of carrying out the process of my invention.

More particularly referring now to the drawing, ethyl alcohol stored in tank 10 is pumped by pump 12 into the alcohol and water tank 14. Water from any appropriate source is pumped by pump 16 through a deionizer 18 through pipe 20, through pipe 22 under the control of valve 24, into the tank 14. The rates of introduction of alcohol and water into the tank 14 determine the concentration of the alcohol and water mixture. In order to best practice my process, this concentration can be 70% alcohol to 30% water. If desired, the amount of alcohol may be increased up to 80%. As will be pointed out more fully hereinafter, increasing the amount of alcohol increases the recycle ratio and is ordinarily not desirable. If the amount of alcohol is less than 55% by weight, the nylon solution cannot be formed. Accordingly, the ethyl alcohol-water mixture must contain at most 45% of distilled or deionized water. It is to be understood, of course, that alcohols, such as propyl alcohols, methanol, or the like, may be employed, though I prefer to use ethyl alcohol in carrying out my invention, and to conduct the process at atmospheric pressure.

In a typical case I employ sixty-eight gallons of ethyl alcohol with twenty-three gallons of deionized water to make the solution in tank 14.

This solution is passed into a nylon dissolving tank 26 through a pipe 28 under the control of valve 30. The tank 26 is provided with an agitator 32 driven by a motor 34. Heat exchange coil 36 is positioned in the tank 26 adapted to be supplied with steam from any appropriate source through pipe 38 under the control of thermostatic valve 40. A thermostat 42 is positioned within the chamber 26 and is adapted to operate the valve control assembly 44. The arrangement is such that the temperature of the alcohol-water solution in the nylon dissolving zone within tank 26 is maintained so that the vapor pressure within the chamber will be substantially zero. In a typical case the temperature is maintained not in excess of 60° C. Soluble nylon pellets 46 are stored in a hopper 48 under the control of valve 50. I may add nylon pellets to the alcohol-water mixture in the tank 26 at a rate so that the nylon will be present in an amount from 3% to 6% by weight. Advantageously, I add thirty pounds of soluble nylon to the quantity of ethyl alcohol-deionized water mixture described above. At this point there will be present in the tank 890 pounds of alcohol, 382 pounds of deionized water and 30 pounds of nylon.

In order to reduce the size of the tank 26, I find it preferable to dissolve the nylon in a smaller quantity of alcohol and water mixture. I may, for example, introduce only 445 pounds of alcohol and 191 pounds of water with the same amount of nylon. It will be observed that this provides an alcohol-water mixture having a ratio of 70% alcohol by weight to 30% water by weight. The amount of alcohol with respect to water can be increased, but the amount of water cannot exceed substantially 30% by weight. If the amount of water is increased beyond this percentage so that there is a greater percentage of water present than 30%, the nylon will not dissolve. The soluble nylon pellets are known to the art and are manufactured by E. I. du Pont de Nemours & Co., inc., of Wilmington, Delaware, and are sold under the trademark "Zytel" 61 nylon resin, a brand of alcohol-soluble polyamides.

It will be understood that having determined the proportions of alcohol, water and nylon, the process conditions are maintained so that this ratio remains constant.

When only a part, such as half, of the alcohol and water mixture is introduced into the solution tank 26 to make the solution as just pointed out, the balance of the alcohol-water mixture is pumped by pump 52 through pipe 53 into a mixer 54, where it is joined by the solution formed in tank 26. This solution is withdrawn from the tank through pipe 56 and pumped by pump 58 through pipe 60 into the mixer 54.

Before getting the apparatus on stream, the soluble nylon pellets are dissolved in the alcohol and water mixture. The speed of solution depends on the temperature, the amount of agitation and on the alcohol concentration. With an alcohol concentration of 70% and a temperature of 60° C. in the dissolving zone, substantially complete solution will be effected in approximately one-half hour. In the continuous process, the rate of withdrawal of the solution from the dissolving zone is such that the nylon will remain in the dissolving zone for a period of from one-half to one and one-half hours. It should be noted that the alcohol-nylon solution is not stable. It forms a reversible gel which passes from the fluid stage to the gelatinous stage in approximately three to seven days, depending on the concentration of nylon in the solution and temperature of storage. Low concentrations of nylon will remain stable for the longer periods. To effect a hysteresis of the gel to restore it to liquid form, it will be necessary to heat the gel. The aqueous dispersion of nylon is quite stable and I have been able to maintain an aqueous dispersion in dispersed condition for a long period of time.

In the example given, the solution leaving the mixer 54 through pipe 62 will have substantially the following composition by weight:

| | Percent |
|---|---|
| Alcohol | 66.8 |
| Deionized water | 28.7 |
| Nylon | 4.5 |

As will be pointed out more fully hereinafter, the process conditions can be varied such that the amount of nylon may lie between 3% and 6% by weight, the amount of water may lie between 20% and 45% by weight, and the amount of alcohol may lie between 55% and 80% by weight. In practice, it would be less advantageous to use 80% alcohol, owing to the fact that there will be larger quantities of alcohol to evaporate to form the finished dispersion. The dispersion is actually formed in a dispersing chamber 70. This is provided with a heat exchange coil 72 and an agitator 74 driven by a motor 76. Steam for heating the contents of the chamber 70 from any appropriate source is adapted to be introduced through pipe 78 under the control of thermostatic valve 80 and withdrawn from the coil through pipe 82. A thermostat 84 within the chamber actuates the valve control 86 for controlling the valve 80. Deionized or distilled water is adapted to be introduced into the chamber 70 through pipe 87 which communicates with pipe 20 and is under the control of valve 88. The concentration of the alcohol-water mixture in the dispersing chamber can be controlled and maintained by continuously introducing additional alcohol from tank 11 and pumping it by pump 13 through pipe 15 under the control of valve 17 for admixture with the water being introduced through pipe 87. The alcohol-nylon solution is introduced from pipe 62 into the chamber through a spray head 90. Before the process is put on stream, I introduce seventy-two and one-half gallons of deionized water into the chamber 70. This is approximately 600 pounds of water. To the water I add a dispersing agent from tank 92. The dispersing agent is pumped by pump 94 past valve 96 through pipe 98 into the chamber 70. For the seventy-two and one-half gallons of water and fourteen gallons of ethyl alcohol, I use approximately one pound of a fatty alcohol sodium sulfate. The amount of the dispersing agent may vary from 0.02% to 2% by weight of the quantity of water in chamber 70, an amount from 0.08% to 0.05% being preferred. Fatty alcohol sodium sulfate is an anionic hydrophilic substance. Known nonionic wetting agents, such as alkylaryl and polyether alcohols, may also be used. A portion of the wetting agent may, if desired, be introduced into the dissolving zone through pipe 100 by opening valve 102. The thermostat 84 is so controlled as to maintain the temperature of the liquid inside the chamber 70 at 87° C. This temperature will produce vapors which are withdrawn from the chamber 70 overhead through pipe 104 which contain 70% alcohol and 30% water. It will be observed that this is the original proportion of alcohol and water in the alcohol-water mixture first formed in carrying out the process. This alcohol-water mixture is condensed in condenser 106 by a cooling medium introduced into the condenser tubing through pipe 108 and withdrawn therefrom through pipe 110. The condensate flows from the condenser 106 through pipe 112 and is returned to the alcohol and water mixture tank 14 where it is reused in the process. The rate of introduction of the nylon solution into the chamber 70 through the pipe 62 was controlled by valve 61 and regulated in the example given to one-half gallon per minute.

The rate of addition of the nylon, alcohol and water solution into the dispersing zone is critical and is governed by the rate of evaporation of alcohol and water. If the rate of introduction is such that the amount of alcohol by weight is increased, the temperature will drop and finally, as the alcohol concentration increases, a point will be reached where the dispersion is destroyed and the nylon is redissolved. If, on the other hand, the nylon, alcohol and water solution is introduced into the dispersing chamber too slowly, the temperature will rise and more alcohol and proportionately more water will distill off. The liquid level will drop and coagulation will ultimately result. Water and alcohol are continuously introduced into the chamber 70 under the control of valves 88 and 17. The nylon dispersion is withdrawn from the chamber 70 through pipe 114 under the control of valve 116 and introduced into a still 118 provided with a heating coil 120 adapted to be heated by steam introduced through pipe 122 under the control of valve 124. The process conditions are such that the maintenance of the vapor temperature at 87° C. will produce a dispersion, the liquid component of which comprises 17% by weight of alcohol and 83% by weight of water. It will be observed that vapors comprising alcohol and water are withdrawn from the chamber 70 through the vapor pipe 104 and that a dispersion of nylon containing water and alcohol is constantly being withdrawn from the chamber 70 through pipe 114. At the same time the solution of nylon in alcohol, which contains water, is being introduced through the spray head 90 into the chamber 70. The rates of flow must be such that the chamber 70 will contain substantially 83% water and 17% alcohol with the temperature of the solution being maintained at 87° C.

If the initial mixture of alcohol and water were 80% alcohol and 20% water, the temperature of the liquid in the dispersing chamber would be maintained at 81.6° C. and the rate of introduction of water through pipe 86 would be such as to maintain a concentration of water in the liquid in the dispersing chamber at 55% by weight. In such case, the vapors passing to the condenser 106 contain 80% alcohol and 20% water, which is the original concentration. My process is such that during the dispersion forming step the temperature is always maintained so that the ratio of alcohol to water being removed from the dispersion chamber is the same as that initially employed to form the nylon solution in alcohol. Owing to the fact that in such case larger quantities of alcohol would be present in the liquid, it would be necessary to distill this alcohol from the liquid to form the desired dispersion in a subsequent distilling zone, as will be more fully pointed out hereinafter. It will be seen that for a continuous process it is necessary to maintain the temperature of the liquid in the dispersing chamber between 81.6° C. and 91.5° C. At temperatures below 81.6° C. there is so much alcohol present that I have a solution, rather than a dispersion, and great quantities of alcohol must be evaporated in order to form the desired dispersion. A loss of nylon may be experienced in this evaporating step. If the liquid is maintained at a temperature in excess of 91.5° C., there will be too little alcohol in the vapors being removed from the dispersing chamber and the process cannot be run continuously. It will be observed that in order to practice my process, the temperature in the dispersing zone must be maintained at the boiling point of the particular water-alcohol solution to produce vapors containing the percent of alcohol which is required to form the initial solution. The minimum concentration of ethyl alcohol to dissolve the nylon is at least 55% by weight.

A noncontinuous process will necessitate the use of larger and more expensive pieces of equipment. The dispersion must be formed from an alcohol solution, after which the alcohol may be evaporated from the dispersion so that only water and nylon are present in the final product. After this, the alcohol can be evaporated without the precipitation or coagulation of nylon. In the still alcohol and some water are evaporated by maintaining the temperature at approximately 100° C. The vapors are removed from the still through pipe 126 and condensed in the condenser 128 by heat exchange with a cooling medium introduced through pipe 130. The condensate, which is a mixture of alcohol and water, is collected in tank 132 from which it is pumped by pump 134 through a pipe 136 to the alcohol and water tank. Owing to the fact that the vapors are largely water, the aqueous dispersion of nylon will become concentrated. The evaporation of water may be continued until a concentration as high as 25% of nylon by weight is obtained. The aqueous dispersion of nylon is pumped by pump 140 through pipe 142 to the tank 144. In this tank the dispersion may be diluted by the introduction of deionized water through pipe 146 under the control of valve 148. An agitator 150 driven by motor 152 serves to make a uniform dispersion. The finished aqueous dispersion of nylon is withdrawn from the tank 144 through pipe 154 under the control of valve 156.

Once the process conditions are established and the temperature is maintained, continuous formation of an aqueous dispersion of nylon is achieved. If small quantities are desired, my apparatus may be employed to operate in a continuous batch mode of operation with the same high yield or utilization of nylon in the aqueous dispersion. By this mode, I establish the same critical process conidtions during the addition of the nylon solution. I then stop the flow of the nylon solution to the dispersing zone and permit the temperature to rise to distill off substantially all the alcohol. I then have the desired batch, the concentration of which depends on how much water has been distilled off.

My process just described operates well in glass or in glass-lined tanks and piping. The nylon particles of the desired dispersion are negatively charged and the dispersion is hydrophilic owing to the fact that water is in the external phase. If metal, such as stainless steel or Monel metal, is employed for the apparatus, I must add a protective colloid, such as agar-agar, gelatin, casein, or the like, in an amount of one-half of or the same quantity as that used for the dispersing agent. The protective colloidal material can be introduced along with the dispersing agent. Alternatively, I may electrically insulate my conductive metal apparatus from ground and apply a negative potential to the metal apparatus with respect to ground from any appropriate D.C. potential source, such as a battery, or the like.

It will be seen that I have accomplished the objects of my invention. I have provided a method of making aqueous dispersions of nylon in which there are extremely high yields and in which there are small losses of nylon. By my method aqueous dispersions of nylon may be economically achieved. I have provided a method of making aqueous dispersions of nylon in which the nylon content may be as high as 25%. My nylon aqueous dispersions may be readily diluted to provide any desired concentration within the limits of my process. I have provided a continuous method of making aqueous dispersions of nylon whereby large quantities of dispersions may be made with a minimum size of equipment. My dispersion is so stable that it can be boiled at 100° C. with surface agitation with no deterioration.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of making an aqueous dispersion of a synthetic, alcohol-soluble, orientable, fiber-forming, long chain polymeric carbonamide which has recurring amide groups as an integral part of the main polymer chain, which includes the steps of dissolving between one percent and six percent by weight of said polymeric amide in a mixture of a low boiling aliphatic alcohol selected from the group consisting of methyl alcohol, ethyl alcohol and propyl alcohol and water, which mixture contains between forty-five percent and twenty percent by weight of water and between fifty-five percent and eighty percent by weight of said aliphatic alcohol in a dissolving zone; heating a mixture of water and said alcohol and from .02 percent by weight to 2 percent by weight of an anionic hydrophilic wetting agent in a dispersing zone to its boiling temperature, said last named mixture containing from about 55% to about 83% by weight of water; continuously introducing the solution of said polymeric amide from the dissolving zone into said dispersing zone; continuously introducing water and said alcohol into said dispersing zone to substantially maintain the level of liquid in said dispersing zone and to control and maintain the concentration of the alcohol-water mixture; maintaining the mixture in said dispersing zone at the boiling temperature thereof; continuously removing alcohol and water vapors from said dispersing zone; and continuously withdrawing an alcoholic aqueous dispersion of polymeric amide from said dispersing zone.

2. A method as in claim 1 which includes the further step of concentrating the polymeric amide in said aqueous dispersion by evaporating a portion of the water therefrom.

3. A method of making an aqueous dispersion of a synthetic, alcohol-soluble, orientable, fiber-forming, long chain polymeric carbonamide which has recurring amide groups as an integral part of the main polymer chain, which includes the steps of dissolving four percent by weight of said polymeric amide in a mixture of ethyl alcohol and water; which mixture contains about thirty percent by weight of water and about seventy percent by weight of said ethyl alcohol, in a dissolving zone; heating a mixture of about eighty percent of water by weight and said alcohol and about .8% by weight of a fatty alcohol sodium sulphate in a dispersing zone to a temperature of about 87° C.; continuously introducing the solution of said polymeric amide from the dissolving zone into said dispersing zone; continuously introducing water and said alcohol into said dispersing zone to substantially maintain the level of liquid in said dispersing zone and to control and maintain the concentration of the alcohol-water mixture; maintaining the temperature in said dispersing zone at about 87° C.; continuously removing alcohol and water vapors from said dispersing zone; and continuously withdrawing an alcoholic aqueous dispersion of polymeric amide from said dispersing zone.

4. A method as in claim 1 which includes the further step of concentrating the polymeric amide in said aqueous dispersion to about ten percent by weight by evaporating a portion of the water therefrom.

References Cited in the file of this patent

UNITED STATES PATENTS

| | | |
|---|---|---|
| 2,296,427 | Daniel et al. | Sept. 22, 1942 |
| 2,313,144 | Gomm | Mar. 9, 1943 |
| 2,595,797 | Leyonmark et al. | May 6, 1952 |
| 2,714,097 | Watson et al. | July 26, 1955 |